Patented May 27, 1947

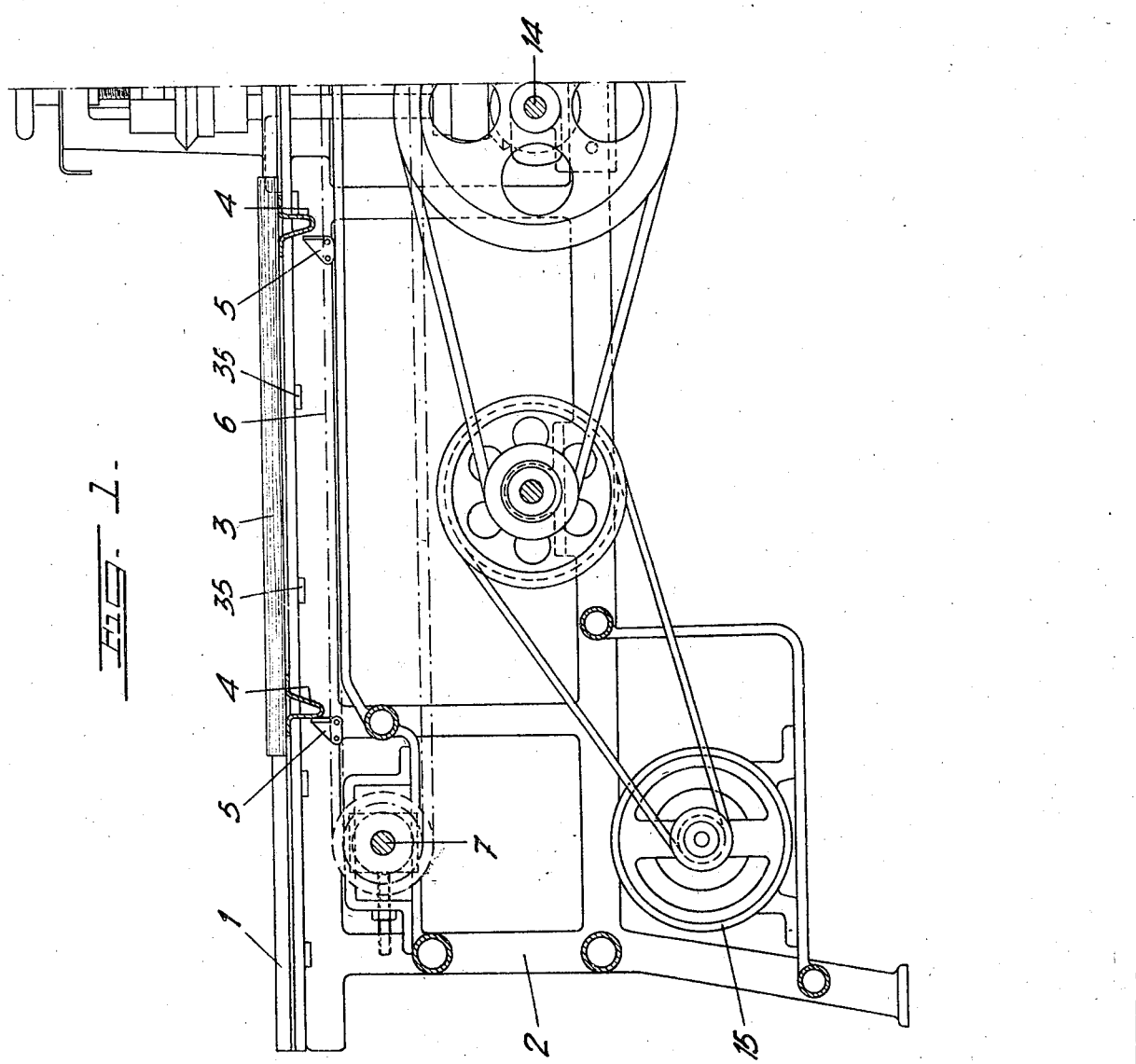

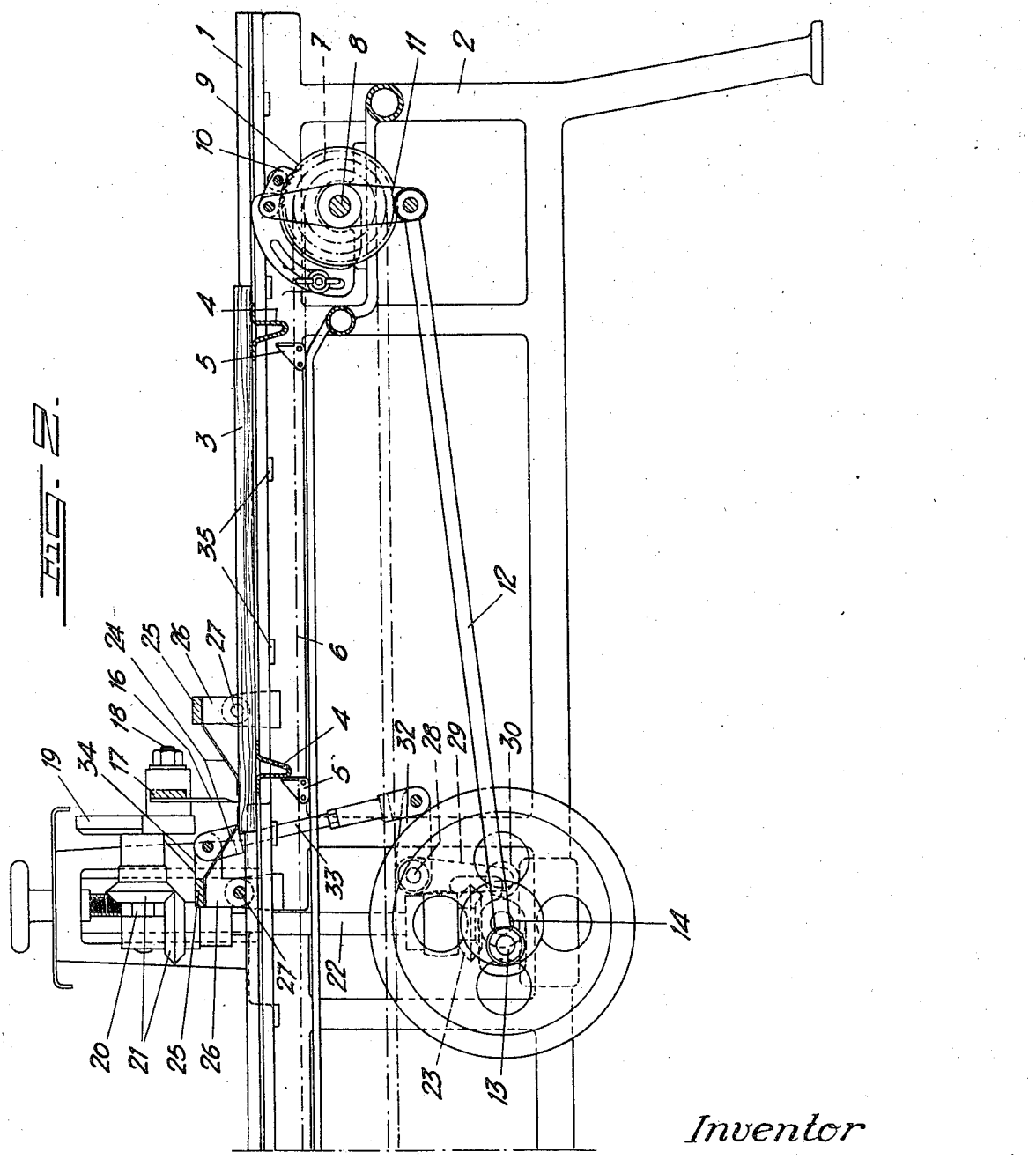

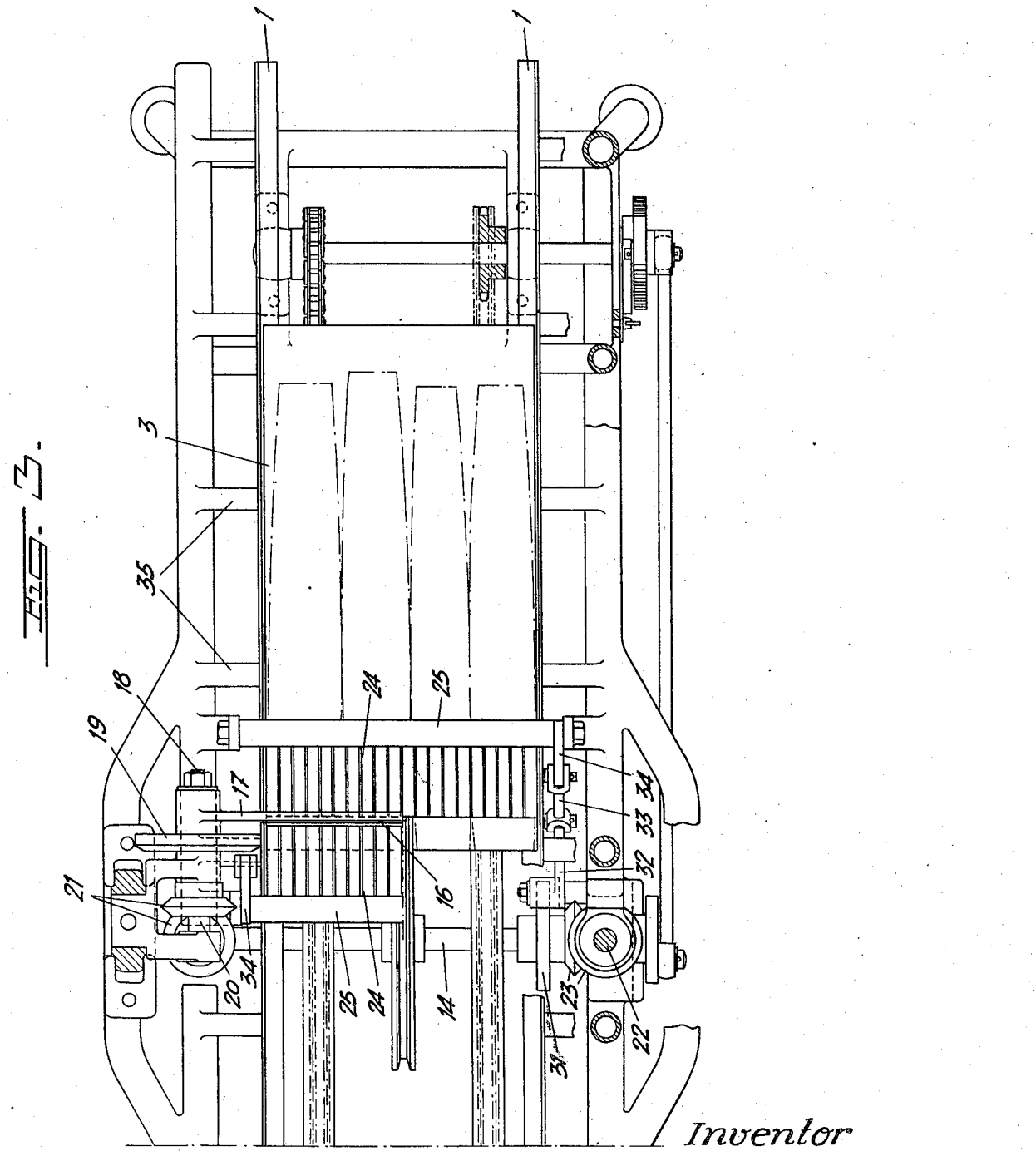

2,421,262

UNITED STATES PATENT OFFICE 2,421,262

MACHINE FOR CUTTING FISH

Knut Georg Vilhelm Helldén, Lysekil, Sweden

Application May 8, 1945, Serial No. 592,589
In Sweden April 1, 1944

4 Claims. (Cl. 17—4)

The present invention relates to a machine for cutting fish, especially herring. Hitherto, the cutting of fish to pieces, as for instance, the cutting of herring to snacks, is usually performed by hand operated means. This is a troublesome and time-wasting work and requires, in otherwise mechanically driven preserving factories, an unduly large staff of workmen.

The object of this invention is to provide an improved machine for automatically effecting the cutting work with a view to reducing the manual work to a minimum, viz. to the placing of the fishes in position for supplying them to the machine and removing the pieces cut. To this end a number of fishes to be cut to pieces are placed side by side upon a loose table or slab which is then put on a stationary guide means or a moving support and passed by steps below a cutting device with the fishes extending in the direction of movement of the table. Following each step the cutting device which operates in a direction at right angles to the direction of movement of the table, cuts through all the fishes lying on the table. By properly adjusting the length of the feeding steps any desired width of the pieces may be obtained. During the cutting operation the fishes are held pressed against the table by spring loaded means provided on both sides of the path of the cutting knife.

In the accompanying drawing a machine embodying the invention is shown by way of example.

Fig. 1 is a side elevation of the inlet end of the machine.

Fig. 2 is a side elevation of the cutting mechanism and the outlet end of the machine.

Fig. 3 is a plan view of the outlet end of the machine with certain parts removed.

A pair of parallel angle bars 1 mounted on a rigid frame 2 by means of transversely extending elastic members 35 afford a vertically resilient guide means adapted to carry a loose table or slab 3 made of wood or other appropriate material to act as a cutting-board for the fishes to be cut to pieces. Fastened to the lower side of the table 3 adjacent both ends thereof are downwardly projecting members 4 adapted to be engaged by grippers 5 carried by an endless chain 6 or the like when the table is placed on the guide means, and to act as feet when the table is removed from the guide means and put aside. The endless chain 6 is supported by chain wheels 7 mounted at the ends of the frame. The chain wheel situated at the delivery end of the frame (Fig. 2) is combined with a pawl and ratchet gear comprising a ratchet wheel 9 keyed to the shaft 8 of the respective chain wheel and a pawl 10 adapted to be driven to and fro by means of a lever 11 pivoted on said shaft 8 which is oscillated from the main shaft 14 of the machine through the intermediary of a crank pin 13 thereon and a connecting rod 12. The main shaft 14 in its turn is driven from a motor 15, Fig. 1.

The main shaft 14 drives, besides the feeding chain 6, as above described, also a cutting mechanism mounted on the frame. Said mechanism comprises a transversely extending knife 16 the edge of which is adapted to describe an endless path above the guide means 1 in a vertical plane at right angles thereto. The knife 16 is attached to a cross-extending carrier 17 which at each end is formed integrally with a longitudinally extending bushing rotatably mounted on a crank pin 18 carried by a disc 19 on a longitudinally extending shaft 20. Each shaft 20 is connected to the main shaft 14 by means of an upper bevel gear 21, a vertical shaft 22 and a lower bevel gear 23. By this means the cycle of operation of the edge of the knife 16 will comprise a straight-lined stroke in one direction across the surface of the table 3 on a level therewith, a semi-circular ascending movement at one longer edge of the table, a straight-lined return stroke on a level above the table which is determined by the eccentricity of the pins 18, and a semi-circular descending movement at the other longer edge of the table.

On either side of the path of the knife, that is to say, in front of and behind the same, is provided a comb-like member comprising a transversely extending beam 25 and a set of flexible arms 24 carried thereby which extend in an oblique direction towards the table 3 so as to bear thereagainst near the line along which the vertical plane through the knife edge crosses the surface of the table. The beams 25 are mounted by means of depending arms 26 on transversely extending pivots 27 and may be caused to turn thereon by power derived from the main shaft 14.

To this end a separate transmission gear is provided for each beam, comprising a cam 31 (Fig. 3) on the main shaft, an arm 29 (Fig. 2) fastened to a stationarily mounted shaft 28 which is adapted to be operated by said cam, another arm 32 on shaft 28, and a link 33 for connecting said other arm 32 to an arm 34 provided at one end of the beam. The transmission gears belonging to the two beams are provided on opposite sides of the frame 2.

The machine described operates as follows:

The fishes, as herrings, to be cut to pieces are placed, after cleaning and gutting, on a table 3 while the latter is removed from the guide means 1 and put aside. The fishes are laid side by side so as to extend in the longitudinal direction of the table. A desired number of fishes being placed on the table, the latter is put on the bars 1 at the inlet end of the frame, Fig. 1. As soon as any grippers 5 of the endless chain 6 strike the depending feet 4 of the table, the table will be caused to move with the chain 6 according as the chain itself is propelled by the pawl and ratchet gear 9, 10. Thus, the table with the fishes lying thereon will be moved by steps the length of which is equal to the length desired of the pieces. Following each step, while the pawl 10 is returning, the knife 16 completes its working stroke, making a transverse cut through all of the fishes on the table. During this cutting operation the fishes are held pressed against the table by the action of the flexible arms 24. Due to the resilient mounting of the bars 1 forming the guide means for the table 3 the latter may afford a longer support for the knife edge at the cutting moment proper. As the pawl 10 reaches the end of its return stroke to start another working stroke, the beams 25 are caused to turn in such a direction as to raise their flexible arms 24, thereby removing them from the fishes; at the same time, the knife 16 is lifted from the table to begin its return stroke. Thus, during the next step of the chain and table the fishes or pieces will be out of engagement with the knife 16 and the arms 24 and may thus be passed further by the table while maintaining their position thereon undisturbed. The cutting of a set of fishes being completed, the table with the pieces lying thereon is lifted from the guide means 1 and passed to the preserving place in any way desired.

It is to be noted that modifications may be made in the construction without departing from the principle of the invention.

What I claim is:

1. A machine for cutting fish to pieces for preserving purposes which comprises in combination, a frame, guide means at the top of said frame, a loose table adapted to be supported by said guide means for carrying the fishes and to act as a cutting board therefor, a chain transmission and grippers thereon to propel the table along the guide means, a pawl and ratchet gear to impart a step by step motion to said chain transmission, a transversely extending knife above said guide means, means to impart a cycle of operation to said knife which includes a horizontal working stroke on a level with the top surface of the table lying on the guide means, a horizontal return stroke on a higher level, and semi-circular transitions between said strokes, flexible members to press upon the fishes at opposite sides of the path of said knife, and means to cause said flexible members to act during the working stroke of the knife only.

2. A machine for cutting fish to pieces for preserving purposes which comprises in combination, a stationary frame, resiliently supported guide means at the top thereof, a loose table adapted to carry the fishes to be cut and to be supported by said guide means, a chain transmission to propel said table on the guide means, a pawl and ratchet gear to impart a movement by steps to said chain transmission, a knife movable in a vertical plane at right angles to the longitudinal direction of said guide means, means to cause said knife to perform a horizontal working stroke on a level with the top surface of said table and a return stroke on a higher level, flexible members to hold the fishes against displacement on the table during said working stroke, a main shaft, means to transmit motion from said main shaft to said pawl and ratchet gear, and other means to transmit motion from the main shaft to said knife and still other means to transmit motion from the main shaft to said flexible members so as to cause them to effect their working strokes during the return strokes of the pawl and ratchet gear.

3. A machine as claimed in claim 2, in which the flexible members to hold the fishes against displacement during the cutting operation proper comprises transversely extending beams rotatably mounted on opposite sides of the path of the knife, a set of flexible arms carried by each beam, and means controlled by the main shaft of the machine to impart a rocking movement to said beams.

4. A machine as claimed in claim 2, in which the chain transmission is provided with gripping elements and in which the table is provided with projections to be engaged by said gripping elements, said projections being arranged to act as feet for the table when removed from the guide means and put aside.

KNUT GEORG VILHELM HELLDÉN.

REFERENCES CITED

The following references are of record in the file of this patent:

UNITED STATES PATENTS

| Number | Name | Date |
|---|---|---|
| 1,465,865 | Pue et al. | Aug. 21, 1923 |
| 593,422 | Overton | Nov. 9, 1897 |